United States Patent
Johnson et al.

(10) Patent No.: US 7,784,342 B2
(45) Date of Patent: Aug. 31, 2010

(54) MULTI-SLOPE VARIABLE RESISTANCE FUEL SENDER UNIT

(75) Inventors: Wade G. Johnson, Oxford, MI (US); Robert Halsall, Washington, MI (US); Shane A. Isenhoff, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 247 days.

(21) Appl. No.: 12/039,354

(22) Filed: Feb. 28, 2008

(65) Prior Publication Data

US 2009/0000375 A1     Jan. 1, 2009

Related U.S. Application Data

(60) Provisional application No. 60/947,351, filed on Jun. 29, 2007.

(51) Int. Cl.
    *G01F 23/00*     (2006.01)
(52) U.S. Cl. ........................ 73/313; 73/317; 73/290 R
(58) Field of Classification Search ............... 73/313, 73/317, 290 R
See application file for complete search history.

(56) References Cited

U.S. PATENT DOCUMENTS 4,480,718 A * 11/1984 Marinelli ............... 184/103.1

FOREIGN PATENT DOCUMENTS

| DE | 3930102 A1 | 3/1990 |
|---|---|---|
| EP | 1719985 A2 | 11/2006 |
| JP | 2003042829 A | 2/2003 |

* cited by examiner

*Primary Examiner*—Hezron Williams
*Assistant Examiner*—Rodney T Frank
(74) *Attorney, Agent, or Firm*—Ingrassia Fisher & Lorenz, P.C.

(57) ABSTRACT

A fuel sender unit is provided for deployment on a vehicle having a fuel tank. The fuel sender unit includes a float arm configured to move in relation to the volume of fuel held within the fuel tank. A fuel level sensor is coupled to the float arm. The fuel level sensor produces a resistance that varies with the position of the float arm to thereby produce a multi-slope sender profile including at least first, second, and third successive profile segments. The first profile segment has an average slope that is greater than that of the second profile segment, and the second profile segment has an average slope that is greater than that of the third profile segment.

20 Claims, 4 Drawing Sheets

MULTI-SLOPE VARIABLE RESISTANCE FUEL SENDER UNIT

CROSS-REFERENCES TO RELATED APPLICATIONS

This application claims the benefit of U.S. Provisional Application No. 60/947,351, filed Jun. 29, 2007.

TECHNICAL FIELD

The present invention generally relates to a vehicular fuel monitoring system and, more particularly, to a multi-slope variable resistance fuel sender unit.

BACKGROUND OF THE INVENTION

Conventional fuel monitoring systems commonly employ a fuel sender unit, which is usually coupled to (and should not be confused with) the vehicle's fuel pump module. The fuel sender unit includes a housing containing a variable resistance fuel level sensor (e.g., a potentiometer or rheostat). The fuel level sensor has a plurality of contact pads disposed thereon, each having a different resistance. A float arm is movably (e.g., rotatably) coupled to the housing and has a float attached to an end thereof. The float buoyantly resides on the upper surface of the fuel held within the vehicle's fuel storage tank, and the arm moves (e.g., rotates) in relation to the volume of fuel within the storage tank. The fuel level sensor's resistance is dependent upon the float arm's rotational position (or height) and, thus, the volume of fuel within the fuel tank. The fuel level sensor provides a variable resistance to a conversion circuit, which generates a voltage signal related to the fuel level sensor's resistance. An output driver circuit receives the voltage signal generated by the conversion circuit and adjusts a fuel gauge (or other such display) to reflect the volume of fuel remaining in the fuel storage tank.

Although conventional fuel monitoring systems of the type described above generally produce accurate readings, this may not always be the case. Over time, contact degradation may increase the resistance of the fuel level sensor's contact pads. Thus, in systems wherein higher resistances are associated with larger fuel volumes, the fuel monitoring system may indicate that there is more fuel in the storage tank than is actually present (known as "false gas"). In addition, the conversion circuit is generally inherently more accurate at high resistance readings and less accurate at low resistance readings. Consequently, in systems wherein higher resistances are indicative of lower fuel volumes, the sender unit provides less accurate fuel level readings at lower fuel volumes (i.e., near empty). Conversely, in systems wherein lower resistances are indicative of lower fuel volumes, the sender unit provides more accurate fuel level readings at lower fuel volumes (i.e., near empty).

There thus exists an ongoing opportunity to provide a fuel monitoring system that overcomes the disadvantages noted above. In particular, it would be desirable to provide a fuel sender unit that produces relatively accurate fuel level readings at lower fuel volumes (i.e., near empty) and, in a preferred embodiment, at high fuel volumes (i.e., near full). It would also be desirable for such a sender unit to eliminate false gas indications due to contact pad degradation. Other desirable features and characteristics of the present invention will become apparent from the subsequent detailed description and the appended claims, taken in conjunction with the accompanying drawings and the foregoing technical field and background.

SUMMARY

A fuel sender unit is provided for deployment on a vehicle having a fuel tank. The fuel sender unit includes a float arm configured to move in relation to the volume of fuel held within the fuel tank. A fuel level sensor is coupled to the float arm. The fuel level sensor produces a resistance that varies with the position of the float arm to thereby produce a multi-slope sender profile including at least first, second, and third successive profile segments. The first profile segment has an average slope that is greater than that of the second profile segment, and the second profile segment has an average slope that is greater than that of the third profile segment.

DESCRIPTION OF THE DRAWINGS

The present invention will hereinafter be described in conjunction with the following drawing figures, wherein like numerals denote like elements, and.

DETAILED DESCRIPTION OF AT LEAST ONE EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Although the following will describe an example of the inventive multi-slope variable resistance fuel sender unit in the context of an automotive fuel monitoring system, it should be appreciated that the fuel sender unit may be utilized to monitor the volume of any stored fluid (e.g., coolant) and may be deployed on other types of vehicles, including watercraft and aircraft.

Figure 1:
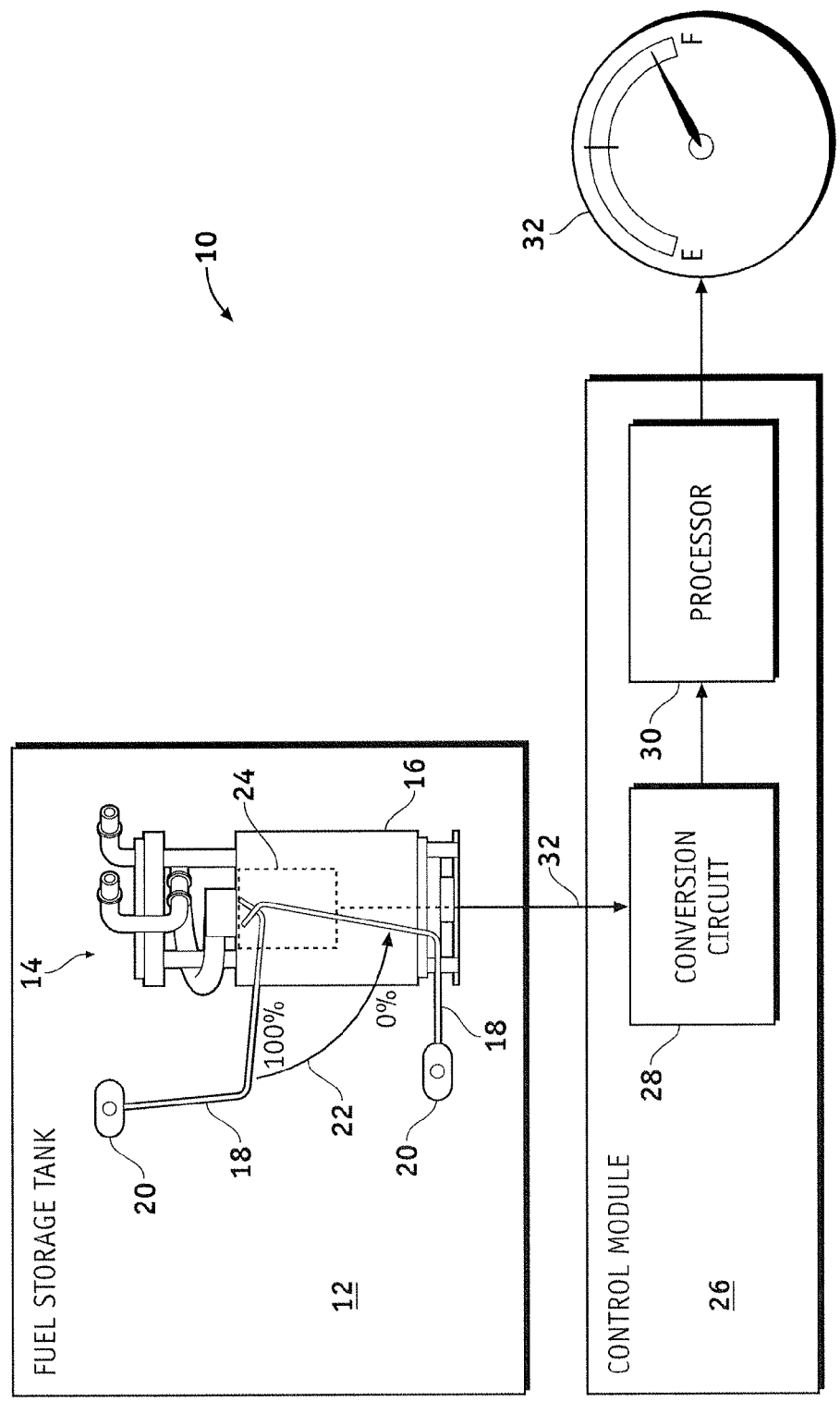
FIG. 1 is functional block diagram of a fuel monitoring system including a variable resistance fuel level sensor and a conversion circuit in accordance with a first exemplary embodiment.

FIG. 1 is a functional block diagram of an exemplary fuel monitoring system 10 suitable for monitoring the volume of fuel remaining within a vehicle's fuel storage tank 12. Fuel monitoring system 10 comprises a multi-slope variable resistance fuel sender unit 14 mounted within fuel storage tank 12.

Fuel sender unit 14 includes a housing 16 having a float arm 18 rotatably coupled thereto. A float 20 is attached to an end of float arm 18 and is configured to buoyantly reside upon the upper surface of the fuel stored within fuel storage tank 12. As the fuel level rises or falls within storage tank 12, so too does float 20. In the illustrated exemplary embodiment, float arm 18 rotates relative to housing 16 to accommodate the movement of float 20. Specifically, float arm 18 rotates between an upper position (fuel tank full), a lower position (fuel tank empty), and various intermediate positions (not shown for clarity). For the purposes of the present discussion, float arm displacement will be expressed in terms of a percentage and determined in relation to the lower position of float arm 18 (fuel tank empty). Thus, as indicated in FIG. 1 at 22, when float arm 18 is in the upper position, float arm displacement is 100% (fuel tank full); and, when float arm 18 is in the lower position, float arm displacement is 0% (fuel tank empty).

A variable resistance fuel level sensor (e.g., a potentiometer or rheostat) 24 is mounted to housing 16 and coupled to float arm 18. Fuel level sensor 24 may comprise any device suitable for producing a resistance that varies in relation to the rotational position of float arm 18 (or, if float arm 18 is configured to move vertically, relative to the height of arm 18). In one implementation, fuel level sensor 24 comprises a carbon resistor card (not shown) having a plurality of contact pads thereon (preferably 50 pads or more) arranged in an arc. As float arm 18 rotates relative to housing 16, a conductive wiper (e.g., conductive wiper 98 shown in FIG. 6 and described below) attached to float arm 18 wipes across the contact pads provided on the carbon resistor card to complete a circuit. The resistance across the carbon resistor card, and more generally the resistance across fuel level sensor 24, changes depending upon which contact pad is electrically contacted by the conductive wiper attached to float arm 18. The resistance across fuel level sensor 24 consequently varies in relation to float arm displacement and, therefore, the volume of fuel remaining within storage tank 12.

Fuel monitoring system 10 further comprises a control module 26 (e.g., a powertrain control module, an instrument cluster, a body control module, etc.), which includes a conversion circuit 28 and a processor 30. Fuel level sensor 24 is electrically coupled to conversion circuit 28, which is, in turn, electrically coupled to processor 30. As will be described below in detail, fuel level sensor 24 provides an adjustable resistance to conversion circuit 28. Conversion circuit 28 provides processor 30 with a digital output signal at output 58 indicative of the voltage appearing at fuel level sensor 24 and, therefore, the volume of fuel remaining within storage tank 12. Processor 30 converts this digital signal to a fuel volume utilizing a known calibration technique (e.g., a two dimensional look-up table) and subsequently updates a fuel display 32 (e.g., a fuel gauge, a digital readout, etc.) to reflect the volume of fuel currently remaining within fuel storage tank 12.

Figure 2:
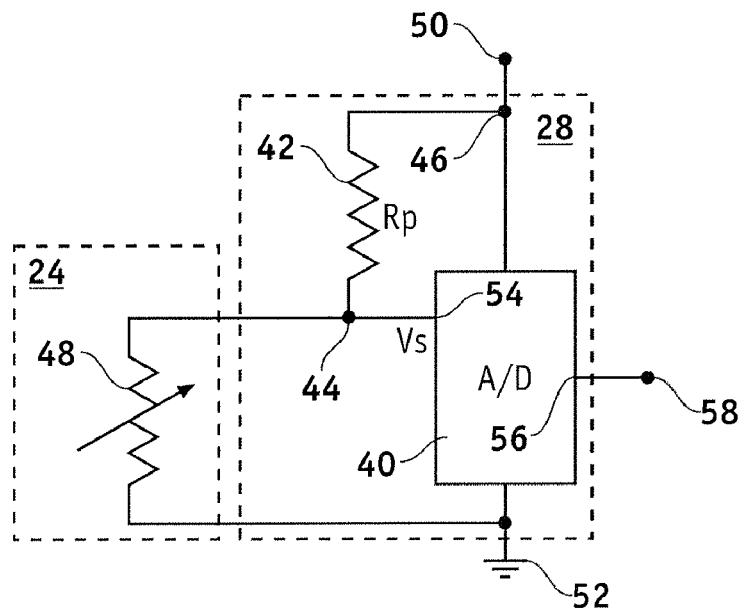
FIG. 2 is a schematic view of the exemplary fuel level sensor and conversion circuit shown in FIG. 1.

FIG. 2 is a schematic view of conversion circuit 28 and fuel level sensor 24 in accordance with an exemplary embodiment. In this example, conversion circuit 28 includes an analog-to-digital (A/D) converter 40 and a pull-up resistor 42 (e.g., 243 ohms), which are electrically coupled at nodes 44 and 46. As stated above and as indicated in FIG. 2, fuel level sensor 24 provides a variable resistance 48 to conversion circuit 28. A/D converter 40, pull-up resistor 42, and fuel level sensor 24 are coupled between first and second supply voltages 50 and 52, which may be, for example, approximately 5 volts and ground, respectively. A/D converter 40 has an input 54 and an output 56. During operation of conversion circuit 28, a voltage ($V_s$) indicative of the resistance across fuel level sensor 24 appears at input 54. A/D converter 40 converts $V_s$ to a digital format and supplies the converted digital signal to processor 30 (FIG. 1) via output 58. Processor 30 then converts the digital signal to a fuel volume in the manner described above. Although not shown in FIG. 2 for clarity, conversion circuit 28 may also include various other standard electronic components (e.g., one or more capacitors or resistors) to protect A/D converter 40 from electrostatic charge.

Figure 3:
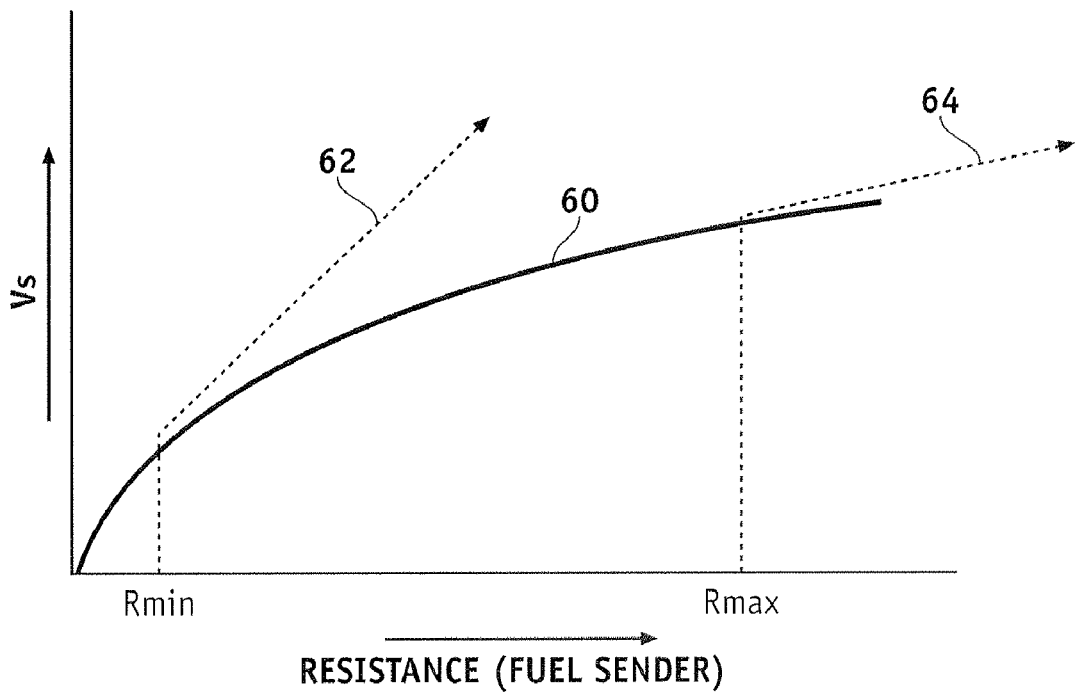
FIG. 3 is a graph illustrating an exemplary response of the conversion circuit shown in FIGS. 1 and 2 for a range of $V_S$ values (vertical axis) and fuel sender unit resistances (horizontal axis), wherein $V_s$ is the voltage generated at the input of the analog-to-digital converter shown in FIG. 2.

FIG. 3 is a graph illustrating an exemplary response curve 60 of conversion circuit 28 over a range of $V_s$ values (vertical axis) and fuel sender unit resistances (horizontal axis), wherein $V_s$ is the voltage generated at input 54 of A/D converter 40 (FIG. 2) based upon the resistance produced by fuel sender unit 14 (FIG. 1). As can be seen in FIG. 3, circuit response curve 60 is non-linear; i.e., the slope of response curve 60 decreases (i.e., flattens out) as fuel sender unit resistance increases. In particular, the slope of circuit response curve 60 is relatively steep at the minimum sender unit resistance ($R_{min}$) as indicated by tangent 62, and the slope is relatively flat at the maximum sender unit resistance ($R_{max}$) flat as indicated by tangent 64. Due to this variation in the slope of response curve 60, conversion circuit 28 is more accurate at lower sender unit resistances (i.e., there is a greater variation in fuel sender unit voltage for a given change in resistance).

Figure 4:
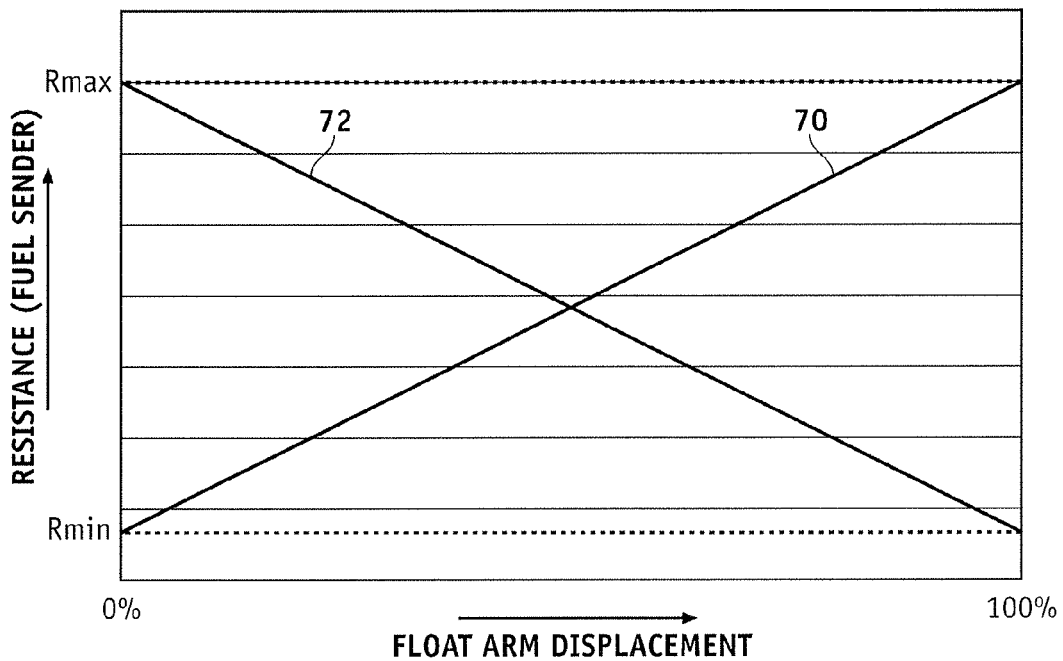
FIG. 4 is a graph illustrating a forward sender unit profile and a reverse sender unit profile for a range of fuel sender unit resistances (vertical axis) and float arm displacements (horizontal axis) in accordance with the teachings of prior art.

FIG. 4 is a graph illustrating typical linear profiles 70 and 72 associated with known sender units for a range of fuel sender unit resistances (vertical axis) and float arm displacements (horizontal axis). Profile 70 is associated with a conventional forward sender unit and may thus be referred to as forward sender unit profile 70. As float arm displacement increases from 0% (fuel tank empty) to 100% (fuel tank full), the resistance of forward sender unit profile 70 increases linearly. As may be anticipated by comparing FIG. 4 to FIG. 3, the product curve of forward sender unit profile 70 and circuit response curve 60 will have a relatively steep slope proximate 0% float arm displacement; thus, forward sender unit profile 70 will advantageously provide relatively accurate fuel level readings at low fuel volumes (i.e., near empty). However, it will also be noted that forward sender unit profile 70 equates higher resistances with larger volumes of fuel; thus, forward sender unit profile 70 will indicate that more fuel remains within storage tank 12 (FIG. 1) than is actually present if resistance increases due to contact pad degradation (a "false gas indication").

Referring still to FIG. 4, profile 72 is associated with a conventional reverse sender unit and may thus be referred to as a reverse sender unit profile 72. Reverse sender unit profile 72 is the inverse of forward sender unit profile 70; as float arm displacement increases from 0% (fuel tank empty) to 100% (fuel tank full), the resistance of the forward sender unit decreases linearly. Reverse sender unit profile 72 associates higher resistances with lower volumes of fuel; consequently, reverse sender unit profile 72 will indicate that there is less fuel held within fuel storage tank 12 (FIG. 1) than is actually present if resistance increases due to contact pad degradation. Thus, as an advantage over forward sender unit profile 70, reverse sender unit profile 72 eliminates false gas indications. However, unlike forward sender unit profile 70, reverse sender unit profile 72 provides less accurate fuel level reading at lower fuel volumes as the product curve of profile 72 and circuit response curve 60 (FIG. 3) has a relatively flat slope near low float arm displacement values (i.e., proximate 0% float arm displacement).

In accordance with the teachings of the present invention, fuel level sensor 24 of variable resistance fuel sender unit 14 (FIG. 1) is configured to produce a multi-slope sender unit profile (also referred to as "multi-slope fuel level sensor profile") that: (1) eliminates false gas indications, and (2) provides relatively accurate fuel level readings at low fuel volumes (i.e., near empty) and, in a preferred embodiment, at high fuel volumes (i.e., near full). The precise shape and the exact values of the multi-slope sender unit profile will inevitably vary amongst different embodiments; however, for the purposes of illustration, the following will describe in detail a specific example of a preferred multi-slope sender unit profile.

Figure 5:
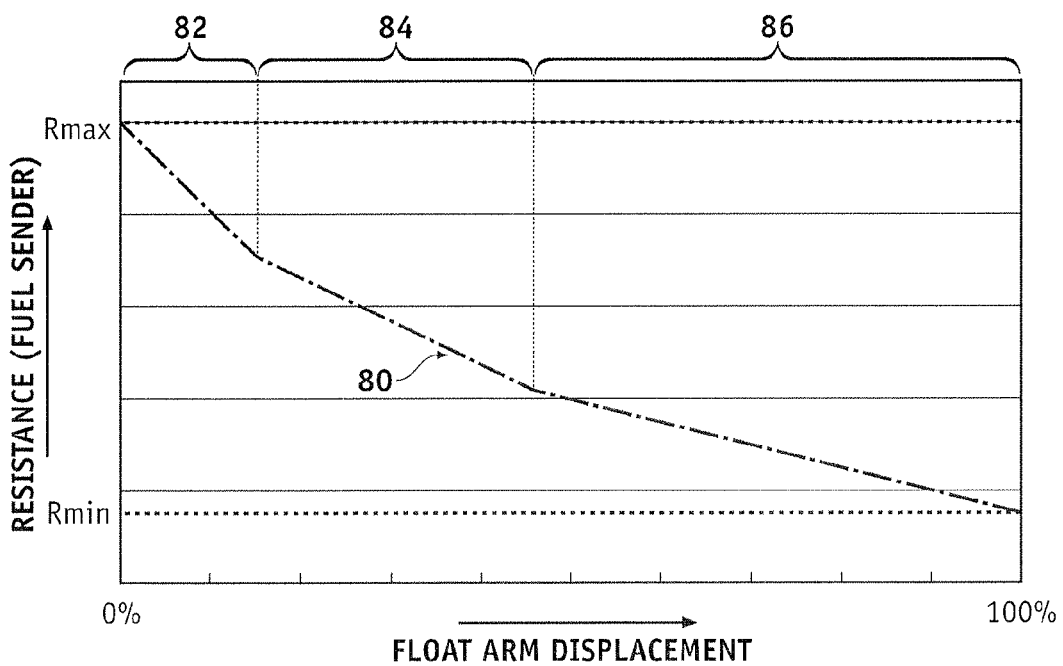
FIG. 5 is a graph illustrating an exemplary multi-slope sender unit profile for a range of fuel sender unit resistances (vertical axis) and float arm displacements (horizontal axis) in accordance with an exemplary embodiment.

FIG. 5 is a graph illustrating an exemplary multi-slope fuel sender unit profile 80 that may be produced by fuel level sensor 24 and, more generally, by fuel sender unit 14 (FIG. 1). In FIG. 5, fuel level sensor resistance is plotted along the vertical axis and float arm displacement is plotted along the horizontal axis with 0% float arm displacement corresponding to an empty tank and 100% float arm displacement corresponding to a full tank. In contrast to forward sender unit profile 70 and reverse sender unit profile 72 (FIG. 4), profile 80 is not linear. Instead, profile 80 comprises multiple successive line segments that collectively approximate a curve. Although any suitable number of segments may be employed, three successive profile segments are shown in FIG. 5; i.e., a first profile segment 82, a second profile segment 84, and a third profile segment 86. Profile segments 82, 84, and 86 may be referred to as the low range, the mid range, and the high range float arm displacement segments, respectively. The slope of profile segment 82 is greater than the slope of profile segment 84, and the slope of profile segment 84 is greater than the slope of segment 86. As may be appreciated by comparing FIG. 5 to FIG. 3, multi-slope sender unit profile 80 approximates the inverse of circuit response curve 60. Consequently, multi-slope sender unit profile 80 compensates for the non-linearity of circuit response curve 60. It will also be noted that multi-slope sender unit profile 80 equates higher resistances with lower fuel volumes; thus, an increase in resistance due to contact pad degradation will not result in a false gas indication.

Figure 6:
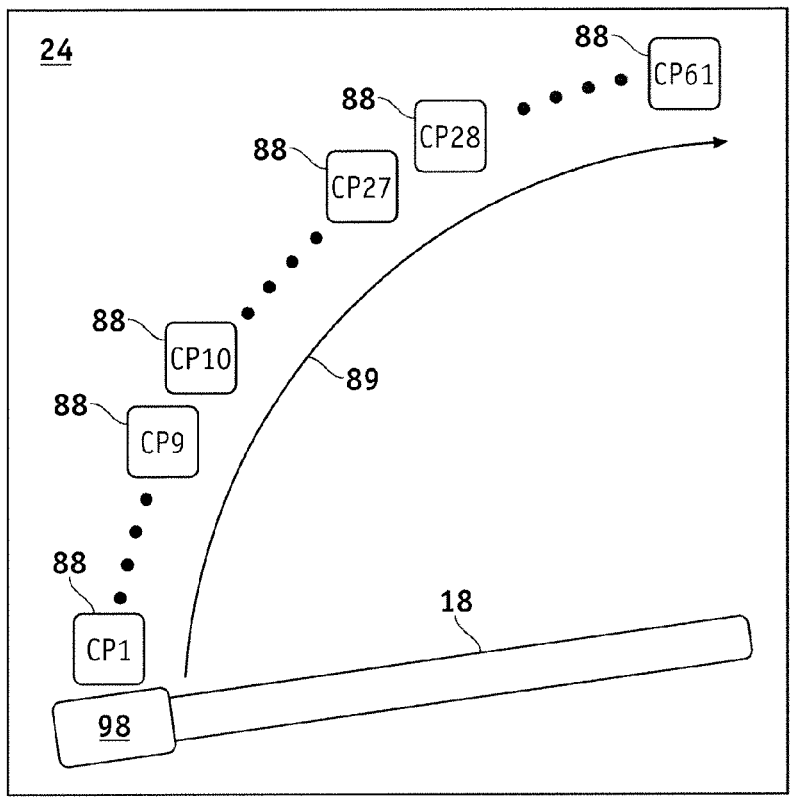
FIG. 6 is a generalized functional view of a fuel level sensor having a float arm coupled thereto in accordance with an exemplary embodiment.

To produce multi-slope sender unit profile 80, the resistance of each contact pad employed by the fuel level sensor is adjusted to a predetermined value utilizing known techniques (e.g., trimming the thickness and/or width of the carbon resistor card on which the contact pads are disposed). FIG. 6 is a generalized functional view of fuel level sensor 24 including a float arm 18 having a conductive wiper 98 attached thereto in accordance with an exemplary embodiment. In this example, fuel level sensor 24 includes 61 electrically-conductive contact pads disposed thereon and arranged in an arc. As the volume of fuel within fuel storage tank 12 (FIG. 1) changes, conductive wiper 98 rotates along path of travel 89 and electrically contacts different ones of contact pads 88. The profile of fuel level sensor 24 is dependent upon the particular resistance produced by electrically contacting each contact pad 88. To produce a sender unit profile including multiple segments having different slopes (e.g., multi-slope profile 80 shown in FIG. 5), the resistance between adjacent contact pads is varied by two or more constant intervals. As a specific example, variable resistance fuel level sensor 24 may be configured such that the resistance between each pad CP1-CP9 is approximately 8 ohms; the resistance between each pad CP10-C27 is approximately 4 ohms; and the resistance between each pad CP28-61 is approximately 2 ohms. The break points (i.e., the locations at which the resistance intervals change) for a three-slope curve preferably occur at approximately 10-20% and 40-50% of the contact pad arc and, more preferably, at approximately 15% and 45% of the contact pad arc.

Figure 7:
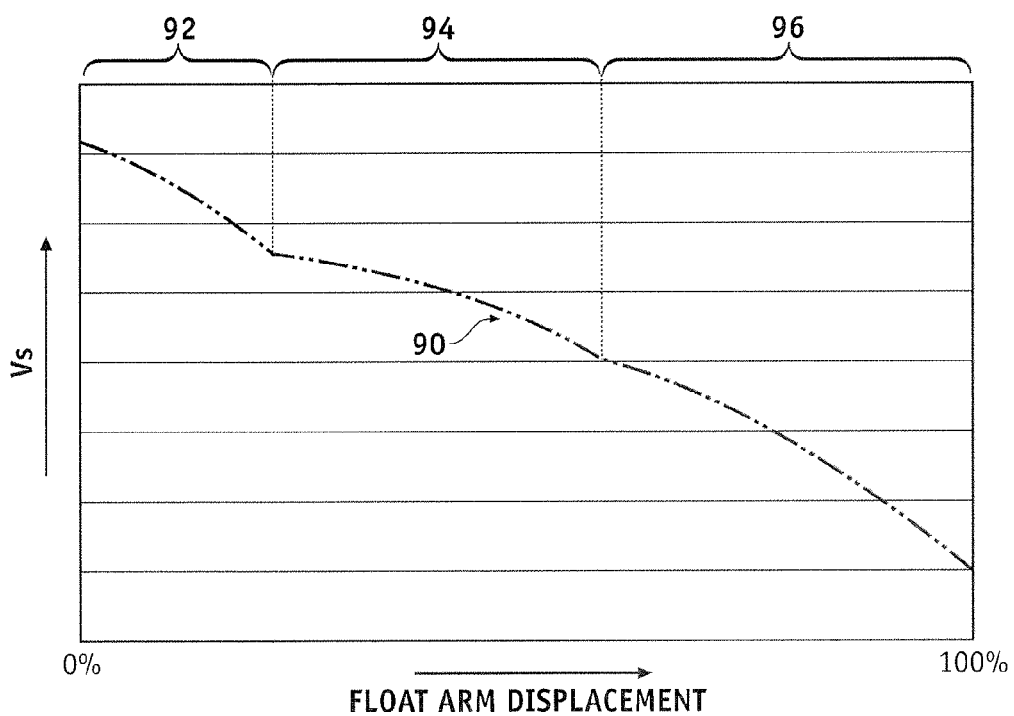
FIG. 7 is a graph illustrating the product curve of the multi-slope sender unit profile (FIG. 5) and the circuit response (FIG. 3) for a range of $V_s$ values (vertical axis) and float arm displacements (horizontal axis).

As previously stated, multi-slope sender unit profile 80 approximately inversely matches circuit response curve 60; however, multi-slope sender unit profile 80 is not a precise inverse of circuit response curve 60. Instead, the slope of multi-slope sender unit profile 80 is chosen to yield a relatively steep product curve proximate 0% float arm displacement (i.e., near empty). In addition, the slope of multi-slope sender unit profile 80 may also be chosen to yield a relatively steep product curve proximate 100% float arm displacement (i.e., near full). To further emphasize this point, FIG. 7 graphically illustrates an exemplary product curve 90 of multi-slope sender unit profile 80 (FIG. 5) and circuit response curve 60 (FIG. 3) wherein $V_S$ is plotted along the vertical axis and float arm displacement is plotted along the horizontal axis. In this example, product curve 90 includes three successive segments: i.e., a first product curve segment 92, a second product curve segment 94, and a third product curve segment 96. Product curve segments 92, 94, and 96 may be referred to as the low range, the mid range, and the high range float arm displacement segments, respectively, of product curve 90. Product curve segments 92, 94, and 96 generally correspond to segments 82, 84, and 86 of multi-slope profile 80 (FIG. 5), respectively. To produce a relatively steep product curve segment 92, the slope of profile segment 82 may be chosen to be greater than the inverse slope of tangent 62 (FIG. 3). Similarly, to produce a relatively steep product curve segment 96, the slope of profile segment 86 may be chosen to be greater than the inverse slope of tangent 64 (FIG. 3). As a result, product curve segments 92 and 96 have a slope that is steeper than that of product curve segment 94.

As explained above, multi-slope fuel sender unit profile 80 (FIG. 5) is chosen such to increase the slope of product curve 90 (FIG. 7) proximate 0% float arm displacement (fuel tank empty) and 100% float arm displacement (fuel tank full). In particular, fuel sender unit profile 80 (FIG. 5) is chosen such that the slope of product curve segments 92 and 96 is increased relative to the slope of segment 94. Increasing the slope of segment 92 improves the accuracy of fuel level readings near empty (0% float displacement) as there is a greater variance in fuel sender unit voltage for a given change in float arm displacement. Similarly, increasing the slope of segment 96 improves the accuracy of fuel level readings near full (100% float displacement) as there is a greater variance in fuel sender unit voltage for a given change in float arm displacement.

The following has thus described a fuel sender unit having a multi-slope profile that eliminates false gas indications and that provides relatively accurate fuel level readings at low fuel volumes (i.e., near empty) and at high fuel volumes (i.e., near full). The above-described multi-slope profile comprised three successive segments, each having a substantially constant slope. This notwithstanding, it will be appreciated that the multi-slope profile may include any number of successive segments equal to or exceeding two; indeed, the number of segments of the multi-slope sender unit profile is limited only by the number of contact pads included in fuel level sensor 24 (FIG. 1). Regardless of the number of segments employed in a particular embodiment of the inventive fuel sender unit, the sender's unit profile may be conceptually divided into at least three successive segments wherein the first segment has an average slope that is greater than the second segment, and the second segment has an average slope that is greater than the third segment.

Of course, the particular values of multi-slope sender unit profile 80 will vary amongst embodiments and in relation to the response of conversion circuit 28. In one specific and non-limiting example wherein pull-up resistor 42 has a value of about 243 ohms, voltage 50 is approximately 5 volts, and voltage 52 is ground (approximately zero volts), sender unit profile 80 may have the following values. $R_{max}$ and $R_{min}$ are preferably approximately 250±20 ohms and 40±10 ohms, respectively, and still more preferably approximately 250±3.3 ohms and 40±2.5 ohms, respectively. In this exemplary case, profile segment 82 may have a start point of about 250±3.3 ohms and an end point of about 178±3.3 ohms, profile segment 84 may have a start point of about 178±3.3 ohms and an end point of about 106±3.3 ohms, and profile segment 86 may have a start point of about 106±3.3 ohms and end point of about 40 ohms ±2.5. Stated in terms of contact pad arc percentage, the fuel sensor resistance may be approximately 250±3.3 ohms at 0% of the contact pad arc (i.e., at the empty stop), 178±3.3 ohms at 15% of the contact pad arc, 106±3.3 ohms at 45% of the contact pad arc, and 40±2.5 ohms at 100% of the contact pad arc (i.e., at the full stop).

It should thus be appreciated that there has been provided at least one example of a fuel sender unit that provides relatively accurate fuel readings at lower fuel volumes (i.e., near empty) and eliminates false gas indications in the event of contact degradation. In one embodiment, the exemplary fuel sender unit also provides relatively accurate fuel readings at higher fuel volumes (i.e., near full). While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A fuel sender unit for deployment on a vehicle having a fuel tank, the fuel sender unit comprising:
   a float arm configured to move in relation to the volume of fuel within the fuel tank; and
   a fuel level sensor coupled to the float arm, the fuel level sensor producing a resistance that varies with the position of the float arm to produce a multi-slope sender profile comprising at least first, second, and third successive profile segments, the first profile segment having an average slope greater than that of the second profile segment, and the second profile segment having an average slope greater than that of the third profile segment.

2. A fuel sender unit according to claim 1 wherein the first profile segment has a substantially constant slope.

3. A fuel sender unit according to claim 2 wherein the second profile segment has a substantially constant slope, and wherein the third profile segment has a substantially constant slope.

4. A fuel sender unit according to claim 1 wherein the fuel level sensor comprises a first plurality of contact pads defining the first profile segment, the resistance between adjacent contact pads in the first plurality of contact pads varying by a first substantially constant interval.

5. A fuel sender unit according to claim 4 wherein the fuel level sensor further comprises a second plurality of contact pads defining the second profile segment, the resistance between adjacent contact pads in the second plurality of contact pads varying by a second substantially constant interval.

6. A fuel sender unit according to claim 5 wherein the first substantially constant interval is greater than the second substantially constant interval.

7. A fuel sender unit according to claim 5 wherein the contact pads are generally arranged in a contact pad arc, and wherein the break point separating the first substantially constant interval from the second substantially constant interval occurs at approximately 10-20% of the contact pad arc.

8. A fuel sender unit according to claim 5 wherein the fuel level sensor further comprises a third plurality of contact pads defining the third profile segment, the resistance between adjacent contact pads in the third plurality of contact pads varying by a third substantially constant interval.

9. A fuel sender unit according to claim 8 wherein the contact pads are generally arranged in a contact pad arc, and wherein the break point separating the second substantially constant interval from the third substantially constant interval occurs at approximately 40-50% of the contact pad arc.

10. A fuel sender unit according to claim 1 wherein the fuel sender unit is configured to be utilized in conjunction with a conversion circuit characterized by a non-linear response curve, and wherein the multi-slope sender profile is approximately the inverse of the non-linear response curve.

11. A fuel sender unit according to claim 10 wherein the product curve of the non-linear response curve and the sender profile comprises first, second, and third successive product curve segments, the first product curve segment having an average slope that is greater than the average slope of the second product curve segment.

12. A fuel sender unit according to claim 11 wherein the third product curve segment has an average slope that is greater than the average slope of the second product curve segment.

13. A fuel sender unit according to claim 1 wherein the fuel sender produces a minimum resistance when the fuel tank is substantially full and a maximum resistance when the fuel tank is substantially empty.

14. A fuel sender unit according to claim 13 wherein the maximum resistance is approximately 250±20 ohms and the minimum resistance is approximately 40±10 ohms.

15. A fuel sender unit for deployment on a vehicle having a fuel tank, the fuel sender unit comprising:
    a housing coupled to the fuel tank;
    a float arm coupled to the housing and configured to move relative thereto in relation to the volume of fuel within the fuel tank, wherein a 0% float arm displacement corresponds to an empty tank and a 100% float arm displacement corresponds to a full tank; and
    a fuel level sensor mounted in the housing, the fuel level sensor coupled to the float arm such that the resistance produced by the fuel level sensor varies with the position of the float arm to produce a multi-slope sender profile comprising a low range float arm displacement segment starting at 0% float arm displacement and a high range float arm displacement segment ending at 100% float arm displacement, the low range float arm displacement segment having an average slope that is greater than the average slope of the high range float arm displacement segment.

16. A fuel sender unit according to claim 15 wherein the multi-slope sender profile further comprises a mid range float arm displacement segment disposed between the low range float arm displacement segment and the high range float arm displacement segment, the mid range float arm displacement segment having an average slope that is less than the average slope of the low range float arm displacement segment.

17. A fuel sender unit according to claim 16 wherein the mid range float arm displacement segment has an average slope that is greater than the average slope of the high range float arm displacement segment.

18. A variable resistance fuel sender unit for use in a vehicle fuel monitoring system of the type that includes a conversion circuit having a non-linear circuit response for converting the sender's variable resistance to a signal representative of the fuel remaining within a vehicle's fuel tank, the sender unit comprising:
 a float arm configured to move in relation to the volume of fuel within the fuel tank; and
 a fuel level sensor coupled to the fuel tank, the fuel sensor coupled to the float arm such that the resistance of the fuel level sensor is determined by the position of the float arm, the fuel level sensor characterized by a multi-slope profile;
 wherein the product curve of the multi-slope profile and the non-linear circuit response comprises at least a low range float arm displacement product segment, a mid range float arm displacement product segment, and a high range float arm displacement product segment, the low range float arm displacement product segment having an average slope that is greater than the average slope of the mid range float arm displacement product segment.

19. A variable resistance fuel sender unit according to claim 18 wherein the high range float arm displacement product segment has an average slope that is greater than the average slope of the mid range float arm displacement product segment.

20. A variable resistance fuel sender unit according to claim 18 wherein the low range float arm displacement product segment is associated with low fuel volumes, and the high range float arm displacement product segment is associated with high fuel volumes.

* * * * *